United States Patent [19]

Kawada

[11] Patent Number: 5,024,141

[45] Date of Patent: Jun. 18, 1991

[54] METHOD FOR THE SYNCHRONOUS OPERATION OF JUXTAPOSED CYLINDER DEVICES

[75] Inventor: Hiroyuki Kawada, Hekinan, Japan

[73] Assignee: Sugiyasu Industries Co., Ltd., Aichi, Japan

[21] Appl. No.: 349,253

[22] Filed: May 9, 1989

[30] Foreign Application Priority Data

Nov. 10, 1988 [JP] Japan ........................... 63-146815[U]

[51] Int. Cl.[5] ........................ F01B 25/04; F15B 11/22; G01B 7/14

[52] U.S. Cl. .................................. 91/171; 91/189 R; 91/361; 91/511; 91/525; 377/24; 324/207.24; 324/207.13

[58] Field of Search ...................... 91/171, 189 R, 361, 91/459, 508, 511, 525; 60/327, 426; 324/207.13, 207.22, 207.24; 377/24

[56] References Cited

U.S. PATENT DOCUMENTS

| | | | |
|---|---|---|---|
| 2,487,402 | 11/1949 | Watson | 91/171 |
| 3,053,053 | 9/1962 | Douglas | 91/171 |
| 3,765,173 | 10/1973 | Harris | 91/171 X |
| 3,968,730 | 7/1976 | Lionet | 91/171 |
| 4,158,129 | 6/1979 | Baumgartner | 377/24 X |
| 4,756,229 | 7/1988 | Drakeley | 91/361 X |
| 4,777,798 | 10/1988 | Jacobson et al. | 91/1 X |
| 4,854,218 | 8/1989 | Stoll | 91/361 X |

FOREIGN PATENT DOCUMENTS 0909370 3/1982 U.S.S.R. ................................ 91/171

*Primary Examiner*—John T. Kwon
*Assistant Examiner*—John Ryznic
*Attorney, Agent, or Firm*—Lahive & Cockfield

[57] ABSTRACT

Either a reciprocating or a stationary part in each of juxtaposed cylinder devices is provided with a scale having alternate projections and depressions which are arranged with regular pitches in a direction of reciprocation of the reciprocating part, while the other part is provided with a sensor engaging the scale for determining whether it is a projection or depression of the scale that the sensor engages at a particular point of time, and producing a pulse whenever it falls in any of the depressions. According to one preferred embodiment, the projections and the depessions of the scale of one of the cylinder devices are staggered relative to those of the scale of the other cylinder device by half a pitch. Thus, when the two cylinder devices are in synchronous operation, the sensors of the cylinder devices produce alternate pulses which do not overlap with each other in the time of occurrence. Therefore, if and when the pulses produced by the two sensors have overlapped with each other in the time of occurrence, it is determined that the operations of the two cylinder devices have become unsynchronized.

11 Claims, 5 Drawing Sheets

METHOD FOR THE SYNCHRONOUS OPERATION OF JUXTAPOSED CYLINDER DEVICES

BACKGROUND OF THE INVENTION

1. Field of the Invention

This invention relates to a method for the synchronous operation of a plurality of juxtaposed cylinder devices. More particularly, it is concerned with such cylinder devices for operating a lift.

2. Description of the Prior Art

According to a known method intended for the synchronous operation of a plurality of juxtaposed cylinder devices which are operated by fluid pressure, their movable parts are mechanically connected to one another so as to move together synchronously and thereby achieve the synchronous operation of the devices. This method has, however, the drawback of complicating in construction the cylinder devices and the apparatus in which they are employed, and requiring an additional space for the installation of the necessary mechanism.

In the event that there is any spatial or other limitation that disables such mechanical synchronization, there is also known a method which employs a distributing valve to distribute an operating fluid uniformly to all cylinder devices. This valve is usually positioned close to a source of fluid supply and is, therefore, much less likely to complicate the cylinder devices or the apparatus in which they are employed. It does not form any obstacle to the operation of those devices or apparatus, or the external appearance thereof. The conventional method employing such a valve, however, has a serious drawback. If the reciprocating movement of the piston rods is repeated when they stay in their intermediate positions relative to their stroke, some positional difference or other unavoidably arises from one piston rod to another. This difference usually amounts to a range of 2 to 5 percent of the length of their stroke. It is necessary to move all of the piston rods to either end of their stroke to eliminate any such difference and thereby restore their synchronous operation.

A high accuracy of synchronism can be expected if an electrohydraulic servo mechanism is employed to control the supply of an operating fluid to cylinder devices. This method cannot however, be expected to be widely adopted, since the servo mechanism is expensive and its proper and effective application requires a high level of technology.

SUMMARY OF THE INVENTION

Under these circumstances, it is an object of this invention to provide an improved method for the resynchronization of the operations of juxtaposed cylinder devices connected to a distributing valve which can easily and reliably correct any failure of any of the devices to operate synchronously with the rest and can thereby restore their synchronous operation quickly.

This object is essentially attained by a method which comprises providing one of said two parts of each said cylinder device with a scale having alternate projections and depressions which are arranged with regular pitches along a direction of reciprocation of said one part, as well as providing the other of said two parts at a given position thereof with a sensor that determines whether a portion of said scale which corresponds to said sensor in position at a particular point of time is a projection or a depression, said sensor producing pulses while making said determination; inspecting a pattern of the pulses produced by the sensor of each of the cylinder devices at all times while the cylinder devices are operating; determining that the operations of the cylinder devices have become unsynchronized, if and when the relative patterns of occurrence of the pulses produced by the sensors have disagreed with the relative patterns of occurrence of pulses produced by the sensors when the cylinder devices are in synchronous operation, by more than a predetermined degree; and controlling the rate of supply of operating fluids to the cylinder devices until the disagreement of the relative patterns of the pulses has been eliminated.

According to a preferred aspect of the invention, a scale of the nature as hereinabove described is provided on a reciprocating part in each of a pair of juxtaposed cylinder devices and a limit switch having an actuator is provided as the sensor on a stationary part in each cylinder device so as to have its actuator engage the scale and produce a pulse whenever its actuator falls in any one of the depressions of the scale. The projections and depressions of the reciprocating part of one of the cylinder devices are staggered by half a pitch relative to those of the other cylinder device. Thus, when the cylinder devices are in normal, or synchronous operation, the limit switches of the cylinder devices produce alternate pulses which do not overlap with each other in the time of occurrence. Hence, if and when the pulses produced by the limit switch of one of the cylinder devices have overlapped with those produced by the limit switch of the other cylinder device in the time of occurrence, it is determined that the operations of the cylinder devices have become unsynchronized. If so determined, the rate of supply of an operating fluid to the cylinder device which is preceding, or operating ahead of, the other cylinder device is reduced until the pulses produced by the two limit switches no longer overlap with each other.

DETAILED DESCRIPTION OF THE INVENTION

Figure 1:
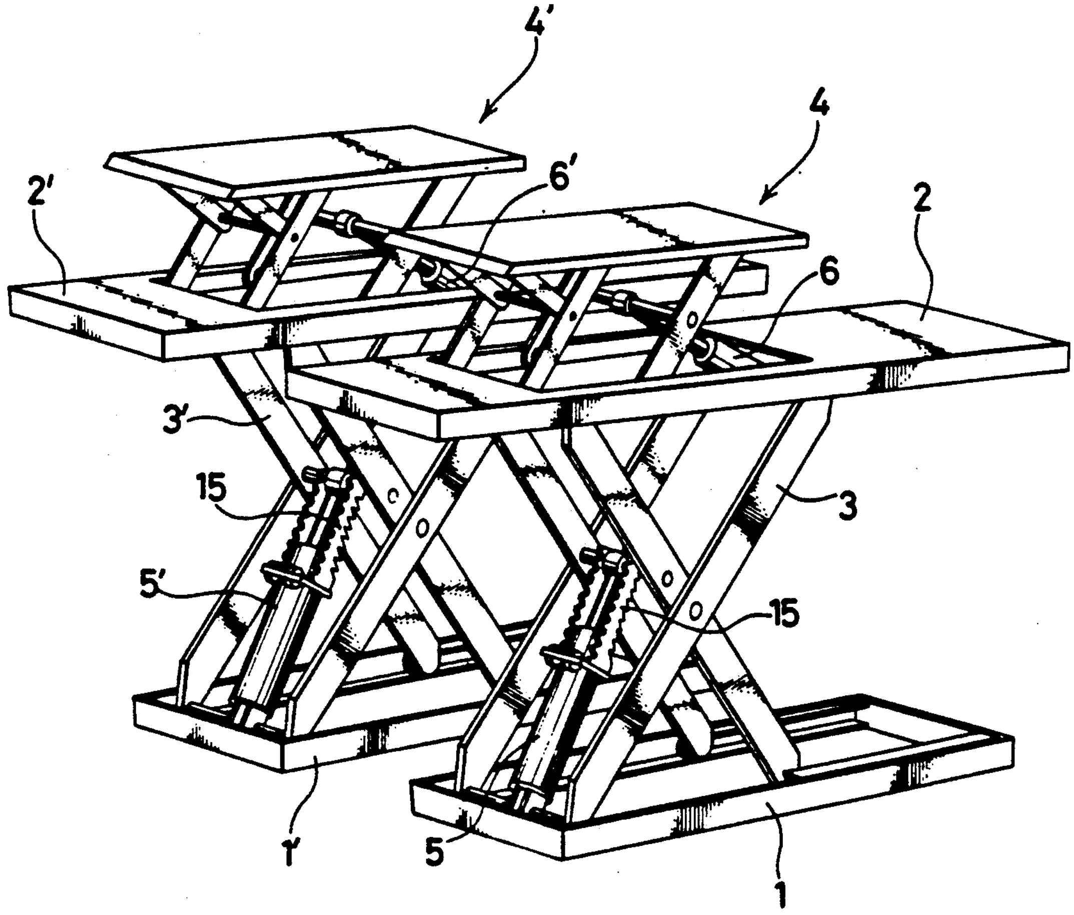
FIG. 1 is a perspective view of a vehicle lift which is operated by employing a method embodying this invention.

Referring to FIG. 1 of the drawings, there is shown by way of example a vehicle lift which can operate by employing a method embodying this invention. It is a lift which is used for raising a vehicle for repair operation.

The lift comprises a pair of appropriately spaced apart parallel bases 1 and 1′ lying in a horizontal plane, a pair of appropriately spaced apart parallel tables 2 and 2′ disposed horizontally above and in parallel to the bases 1 and 1′, respectively, a pair of scissors jacks 3 and 3′ connected between the base 1 and the table 2 and between the base 1' and the table 2', respectively, and a pair of auxiliary jacks 4 and 4' supported on the tables 2 and 2', respectively. The lift is, therefore, of a double-staired type.

Figure 2:
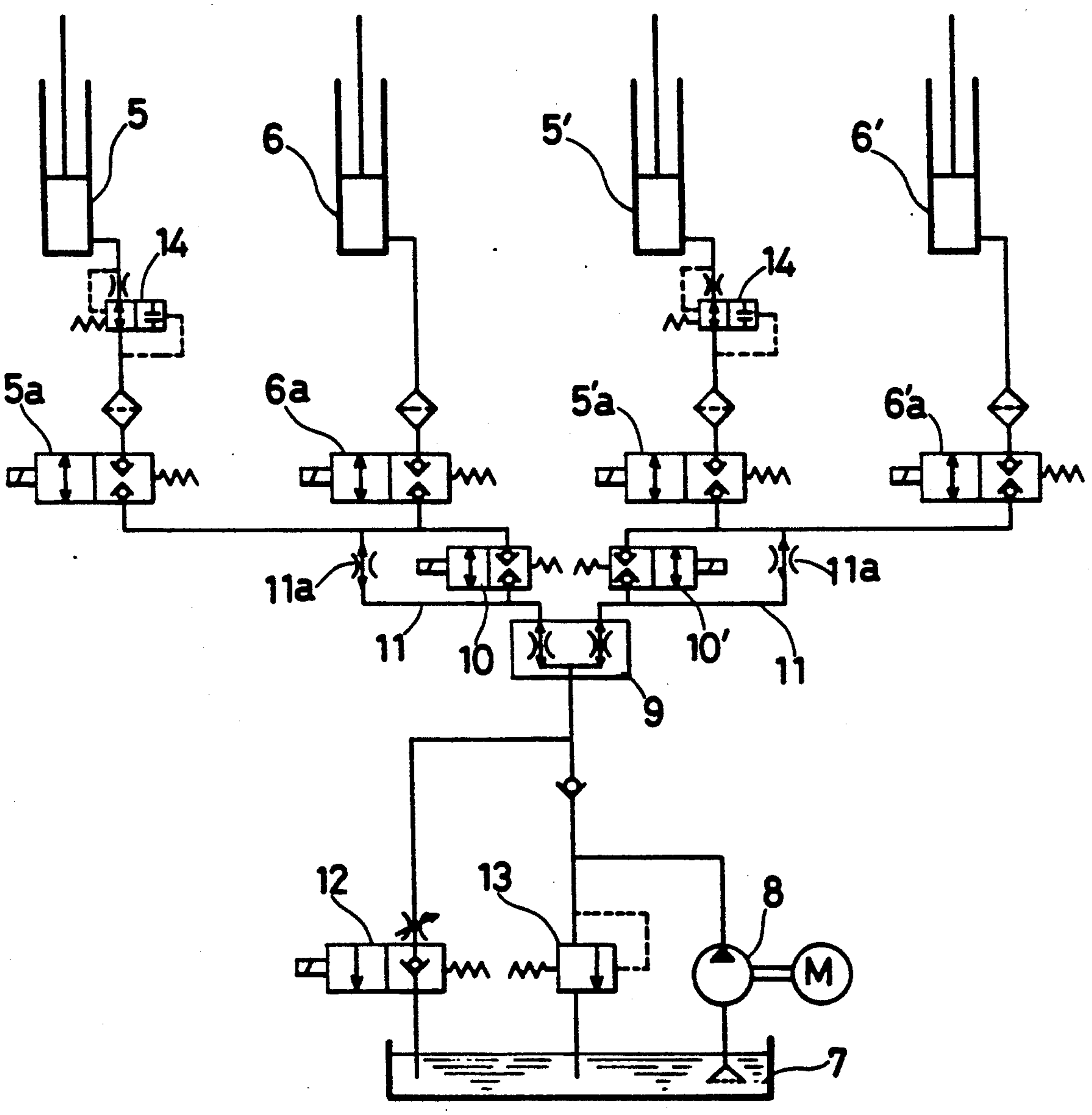
FIG. 2 is a diagram showing a hydraulic circuit employed for the operation of the lift shown in FIG. 1.

The lift further includes a pair of main cylinder devices 5 and 5' which are operated by fluid pressure to operate the scissors jacks 3 and 3', respectively, and thereby raise or lower the tables 2 and 2', respectively, and a pair of auxiliary cylinder devices 6 and 6' which are operated by fluid pressure to operate the auxiliary jacks 4 and 4', respectively. The main and auxiliary cylinder devices 5, 6, 5' and 6' are connected in parallel to one another to form a hydraulic circuit as shown in FIG. 2. An operating fluid is supplied under pressure from a fluid reservoir 7 to a distributing valve 9 through a pump 8 and is distributed by the valve 9 to the cylinder devices 5, 5', 6 and 6' through shutoff valves 5a, 5'a, 6a and 6'a, respectively. A shutoff valve 10 is provided in a fluid passage leading from the valve 9 to the shutoff valves 5a and 6a, and another shutoff valve 10' in a fluid passage leading from the valve 9 to the shutoff valves 5'a and 6'a. A bypass 11 having a throttle 11a extends from the valve 9 to the shutoff valves 5a and 6a and another bypass 11' having a throttle 11'a extends from the valve 9 to the shutoff valves 5'a and 6'a. A valve 12 is provided in a fluid return passage extending from the valve 9 to the reservoir 7 and allows the operating fluid only to return from the valve 9 to the reservoir 7. A relief valve 13 is provided in a fluid return passage extending from the fluid passage between the pump 8 and the valve 9 to the reservoir 7. A fuse valve 14 is provided between the cylinder device 5 and the shutoff valve 5a, and another fuse valve 14' between the cylinder device 5' and the shutoff valve 5'a.

Figure 3:
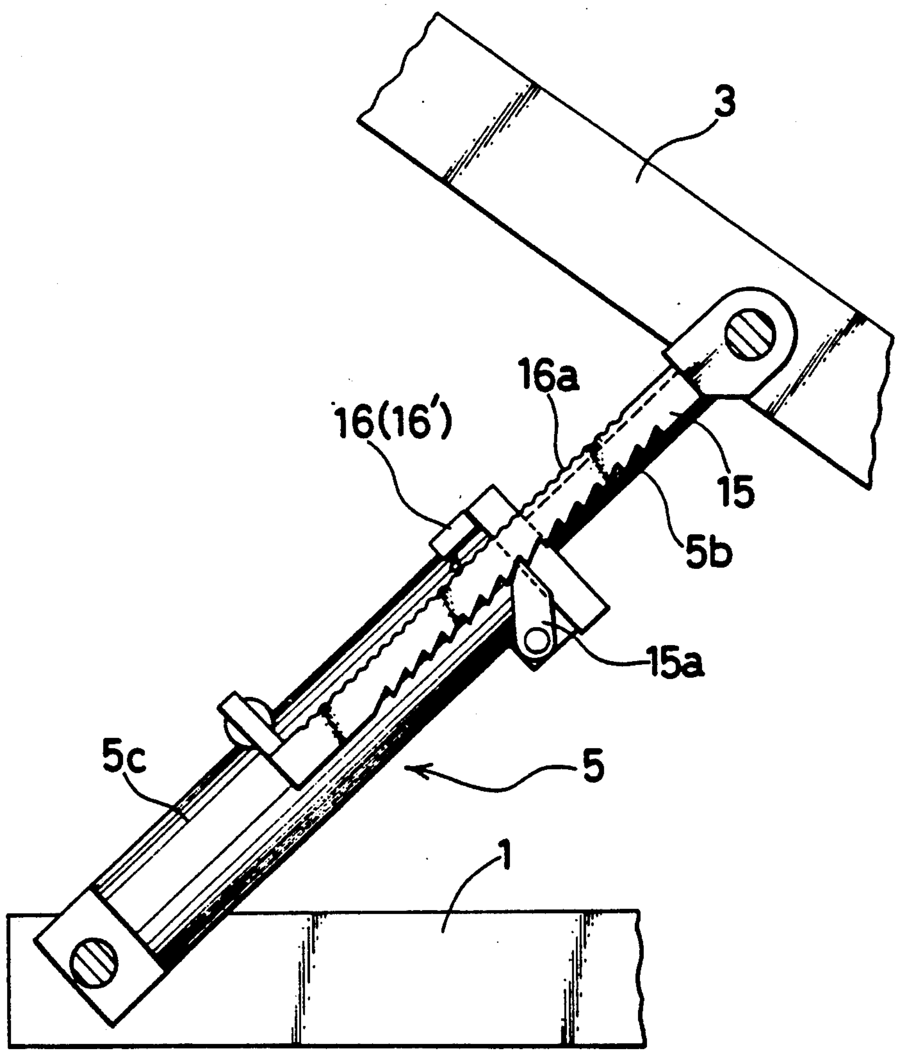
FIG. 3 is an enlarged side elevational view of one of two cylinder devices in the lift, showing particularly a scale and sensor arrangement provided thereon.

The cylinder device 5 for raising and lowering the table 2 (hereinafter referred to as the "right cylinder device") has a lower end pivotally supported on the base 1, and includes a piston rod 5b having an upper end pivotally connected to the jack 3, as shown in FIG. 3. The reciprocating movement of the piston rod 5b causes the opening and closing of the jack 3 and thereby the vertical movement of the table 2. The cylinder device 5 further includes a cylinder housing 5c as a stationary part and a rack member 15 as another reciprocating part. The rack member 15 extends in parallel to the piston rod 5b and has an upper end connected to the upper end of the piston rod 5b, while its lower end is movable on the cylinder housing 5c, so that the rack member 15 may reciprocate along the cylinder housing 5c together with the piston rod 5b. The rack member 15 has a train of teeth on one side thereof, and the cylinder housing 5c is provided adjacent to its upper end with a pawl 15a which is engageable with any of the teeth on the rack member 15 for holding the piston rod 5b in an advanced position to maintain the table 2 in a raised position.

According to a salient feature of this invention, the rack member 15 is also corrugated on the opposite side thereof from the teeth to provide a scale 16a having alternate projections and depressions which are arranged with regular pitches, while a pneumatically-operated limit switch 16 is provided on the cylinder housing 5c adjacent to its upper end on the opposite side of the rack member 15 from the pawl 15a, as shown in FIG. 3. The limit switch 16 includes an actuator engaging the scale 16a and is adapted to produce a pulse whenever its actuator falls in any of the depressions of the scale 16a. The left cylinder device 5' for moving the table 2' vertically is identical in construction to the right cylinder device 5, except that the scale of the left cylinder device 5' comprises projections and depressions which are arranged with the same regular pitches as those of the scale of the right cylinder device 5, but are staggered by half a pitch relative to those of the scale of the right cylinder device 5.

Figure 5A:
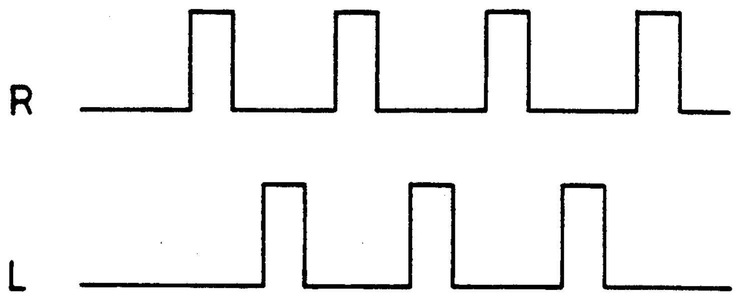
FIGS. 5(*a*) to 5(*c*) are diagrams showing pulses produced by the sensors on the cylinder devices.

Thus, when the two piston rods, i.e., the piston rod 5b of the right cylinder device 5 and the piston rod 5b of the left cylinder device 5', are normally operating, that is, synchronously extending or retracting, each of the limit switches 16 and 16' produces a pulse in the middle of the interval between two successive pulses produced from the other limit switch (16 or 16'), as illustrated in FIG. 5(a). To be more exact, at such a time, the pulse produced by one of the limit switches has its rising edge right in the middle of the interval between the rising edges of two successive pulses by the other limit switch.

Figure 5B:
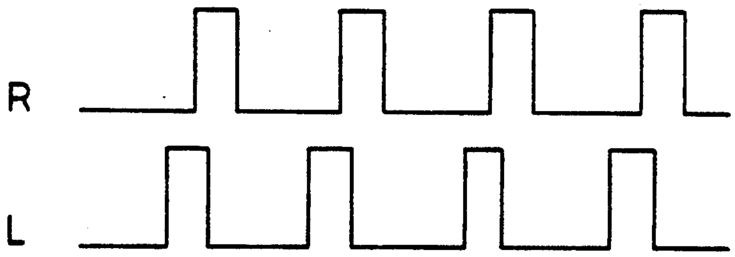
Figure 5C:
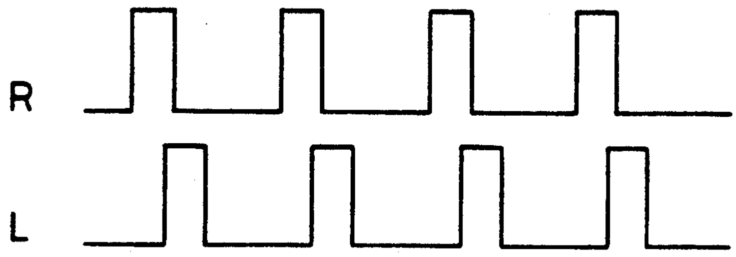

However, the operations of the two piston rods 5b may become unsynchronized for some reason or other to such a degree that the pulses by the limit switches 16 and 16' overlap with each other. That is, it may happen that either the right piston rod precedes, or moves (extend or retract) ahead of, the left piston rod such that the pulses produced by the right limit switch overlap with those by the left limit switch as shown in FIG. 5(b) or the left piston rod precedes the right piston rod such that the pulses produced by the left limit switch overlap with those by the right limit switch as shown in FIG. 5(c).

Figure 4:
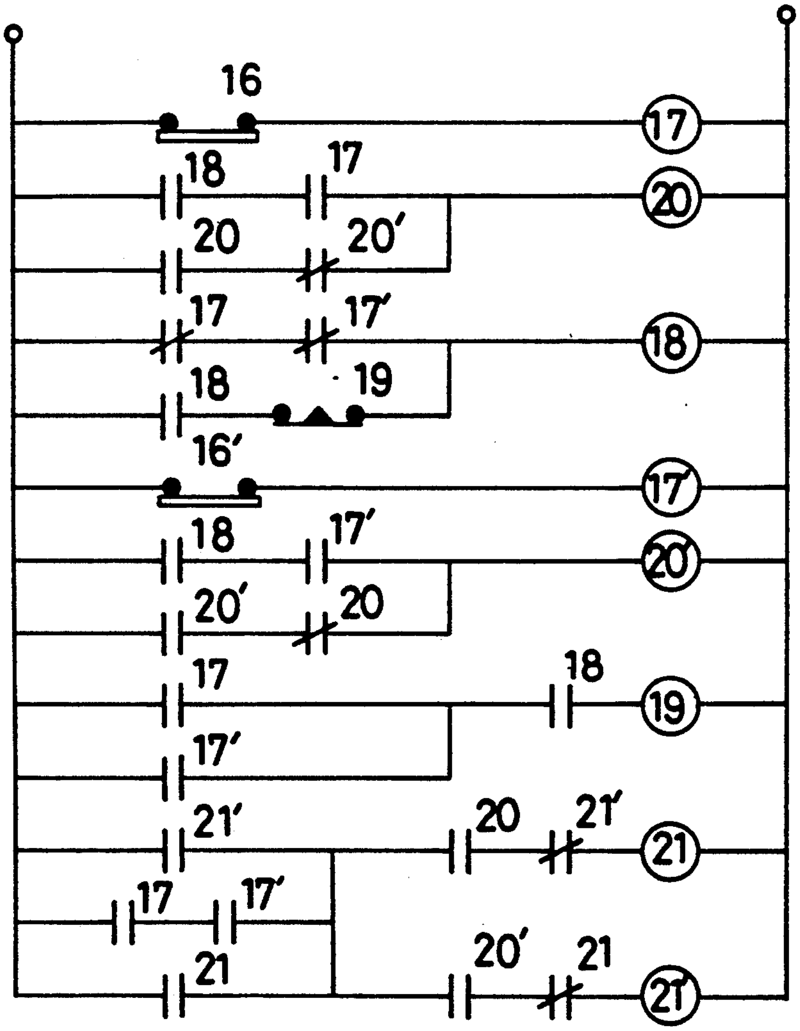
FIG. 4 is a diagram showing an electrical-control circuit for the cylinder devices.

According to the invention, if the operations of the two piston rods 5b have become unsynchronized to the foregoing degree, the unsynchronized operations of the piston rods are detected, the preceding piston rod is identified, and the amount of an operating fluid supplied to the preceding piston rod is so reduced as to operate the two piston rods synchronously again. These operations can be made by employing an electrical control circuit of FIG. 4, for example.

The control circuit includes a pair of judge relays 17 and 17' which are operated in response to the pulses produced by the limit switches 16 and 16', respectively, (b) a detecting relay 18 which is operated if the operations of the two piston rods 5b become unsynchronized to the foregoing degree and, hence, the relays 17 and 17' are simultaneously operated, (c) a timing relay 19 for setting the self-holding time of the detecting relay 18, (d) a pair of relays 20 and 20' that identifies the preceding piston rod, and (e) a pair of control relays 21 and 21'. If the preceding piston rod is the right piston rod, the control relay 21 is operated to close the shutoff valve 10, thereby stopping the supply therethrough of the operating oil and allowing it to be supplied only through the bypass 11 until the two piston rods resume their synchronous operations. Likewise, if the preceding piston rod is the left piston rod, the control relay 21' is operated to close the shutoff valve 10', thereby stopping the supply therethrough of the operating oil and allowing it to be supplied only through the bypass 11' until the two piston rods resume their synchronous operations.

Initially, i.e., when the tables 2 and 2' are in their lowest positions, the actuators of both the limit switches 16 and 16' rest on the flat surface of rack 15 and, hence, neither of the limit switches 16 and 16' produces a pulse. Therefore the judge relays 17 and 17' are OFF. However, the detecting relay 18 is designed to be ON initially. And the detecting relay continues to be ON until the self-holding time set by the timing relay 19 has elapsed. When the actuator of the right limit switch 16 falls into one of the depressions of the scale, the judge relay 17 is operated, and the identify relay 20 is operated and holds itself. The judge relay 17' for the left piston rod, however, is OFF and the control relay 21, therefore, is not operated. As a result of further advancement of the piston rods, both of the judge relays 17 and 17' become OFF and the control circuit returns to its initial state. Then, the actuator of the left limit switch 16' falls in one of the depressions of the scale and, hence, the judge relay 17' is operated, and the identify relay 20' is operated and holds itself. However, since the judge relay 17 is OFF, the control relay 21' is not operated. As long as the two piston rods are in synchronous operation, the control circuit repeats this process.

If the right piston rod precedes the left piston rod as indicated by FIG. 5(*b*), the judge relay 17' for the left piston rod is first operated and, hence, the identify relay 20' is operated and holds itself. Then, the judge relay 17 for the right piston rod 5 is also operated and, hence, the control relay 21' is operated to close the shutoff valve 10. Thus, the operating speed of the right piston rod is reduced. The identify relay 20' is still holding itself. Then the judge relay 17' becomes OFF, but the control relay 21' is still ON. The judge relay 17 then becomes OFF, but the control relay 21' is still ON. Then the judge relay 17 for the right piston rod becomes ON earlier than the judge relay 17', and the identify relay 20 becomes ON, and both the control relays 20 and 20' become OFF.

If the left piston rod precedes the right piston rod as indicated by FIG. 5 (*c*), the control relay 21 is operated instead of the control relay 21'. No further description is, however, made of the control which takes place in this case, since it substantially duplicates what has hereinabove been described in connection with the foregoing case where the right piston rod has preceded the left piston rod. No particular description is made, either, of the control which takes place when the piston rods are operated for lowering the tables as it also substantially duplicates what has hereinabove been described. It is, however, to be understood that the sequence of control for the right and left piston rods depends on the positional relationship between the scales (or the limit switch) of the two cylinder devices. The same principle of control as hereinabove described applies to the cylinder devices 6 and 6' for the auxiliary jacks 4 and 4', respectively, and no further description thereof is, therefore, made.

In the foregoing embodiment, the corrugations (projections and depressions) of each scale are staggered by half a pitch relative to those of the other scale so as to produce alternate pulses. However, it is not necessary to stagger the corrugations of the scales if instead the actuators of the limit switches are staggered by an interval which is equal to a half of the pitch of the corrugations of the scale.

Also, if desired, it is possible to use the combination of a rack having not a scale, but a limit switch and a cylinder having not a limit switch, but a scale.

In addition, it is also possible to use any type of sensor other than a pneumatic limit switch for the reading of the scale. Moreover it is possible to employ any other way to control the supply of the operating fluid to the cylinder devices, such as analyzing the pulses and calculating their difference electrically to effect variable control of the fluid supply.

What is claimed is:

1. A method for synchronizing the operations of plural cylinder devices, each including a reciprocating part and a stationary part, which comprises (a) providing one of said two parts of each said cylinder device with a scale having alternate projections and depressions which are arranged with regular pitches along a direction of reciprocation of said reciprocating part, as well as providing the other of said two parts at a given position thereof with a sensor that determines whether a portion of said scale which corresponds to said sensor in position at a particular point of time is a projection or a depression, said sensor producing pulses while making said determination, (b) monitoring a pattern of the pulses produced by the sensor of each of the cylinder devices while the cylinder devices are operating, (c) determining that the operations of the cylinder devices have become unsynchronized, if and when the relative patterns of occurrence of the pulses produced by the sensors disagree with the relative patterns of occurrence of pulses produced by the sensors when the cylinder devices are in synchronous operation, by more than a predetermined degree, and (d) controlling the rate of supply of operating fluids to the cylinder devices until the disagreement of the relative patterns of the pulses has been eliminated, thereby synchronizing the operations of the cylinder devices.

2. A method for synchronizing the operations of a pair of cylinder devices, each including a reciprocating part and a stationary part, which comprises (a) providing the reciprocating part of each said cylinder device with a scale corrugated to provide equally pitched projections and equally pitched depressions along a direction of reciprocation of the reciprocating part, as well as providing the stationary part of each said cylinder device at a given position thereof with a limit switch which has an actuator to engage said projections and depressions and is adapted to produce pulses whenever the actuator falls in any one of said depressions, said projections and depressions of the reciprocating part of one of said cylinder devices being staggered by half a pitch relative to said projections and depressions of the reciprocating part of the other cylinder device, respectively, so that when said cylinder devices are in synchronous operation, said limit switches of said cylinder devices produce pulses which do not overlap with each other in the time of occurrence, (b) monitoring the pulses produced by said limit switches of said cylinder devices while said cylinder devices are operating, (c) determining that the operations of said cylinder devices have become unsynchronized, if and when the pulses produced by said limit switch of one of said cylinder devices overlap with the pulses produced by said limit switch of the other cylinder device in the time of occurrence, and (d) reducing the rate of supply of an operating fluid to one of said cylinder devices which is proceeding, or operating ahead of, the other cylinder device, until the pulses produced by said limit switches no longer overlap with each other, thereby synchronizing the operations of the two cylinder devices.

3. A method in accordance with claim 1 wherein the plural cylinder devices comprises a pair of cylinder devices.

4. A method in accordance with claim 3 wherein the cylinder devices are juxtaposed.

5. A method in accordance with claim 1 wherein the cylinder devices are juxtaposed.

6. A method in accordance with claim 2 wherein the cylinder devices are juxtaposed.

7. Apparatus for selectively synchronizing the operations of plural cylinder devices, each including a reciprocating part and a stationary part, which comprises (a) means forming scale means on one of said two parts of each said cylinder device, said scale means having scale indicia, including corrugations for providing equally pitched projections and equally pitched depressions, arranged along a direction of reciprocation of said reciprocating part, (b) sensor means on the other of said two parts at a given position, said sensor means being responsive to said scale indicia for producing signal pulses in response to positional movement, along the direction of reciprocation, of said scale mans relative to said sensor means, (c) means for monitoring said pulses produced by said sensor means of said plural cylinder devices, (d) means for determining that the operations of the plural cylinder devices lack selected synchronization, in response to the relative patterns of said pulses produced by said sensor means of said plural cylinder devices disagreeing in time, by more that a selected degree, with the relative patterns of occurrences of said pulses produced by said sensor means of said cylinder devices during operation with selected synchronism, and (e) means for controlling the relative rates of supply of operating fluids to said cylinder devices to eliminate the disagreement of the relative patterns of the pulses, thereby to attain said selected synchronization of the operations of said cylinder devices.

8. Apparatus in accordance with claim 7 wherein said means for controlling the relative rates of supply of operating fluids to said cylinder devices comprises a means for reducing the rate of supply of said operating fluids to one cylinder device of said pair which is preceding, or operating ahead of, the other cylinder device of said pair.

9. Apparatus in accordance with claim 7 wherein said sensor means comprises a limit switch including an actuator for engaging said scale indicia of said scale means.

10. Apparatus for synchronizing the operations of plural cylinder devices, said apparatus comprising (a) pulse-producing first relay means coupled with a stationary portion of each of said devices, said relay means including a switch which engages a scale arranged for movement with a reciprocating portion of each of said devices, (b) cylinder-identifying means coupled to said first relay means, (c) detecting means coupled to said first relay means and to said cylinder-identifying means for determining the synchronicity of said cylinder devices by comparing the relative patterns of occurrence of the signals produced by said first relay means with those produced when the devices are in synchronous operation, (d) timing-relay means coupled to said detecting means for setting a holding time, and (e) means responsive to the determination of said detecting means for actuating a valve for controlling the flow of an operating fluid to said devices, whereby said valve-controlling means regulates the rate of supply of said operating fluid to said cylinder devices so that said pulses produced by said first relay means do not disagree with the relative patterns of occurrence of such pulses produced when the cylinder devices are in synchronous operation by more than a predetermined amount, thereby synchronizing the operation of said cylinder devices.

11. Apparatus in accordance with claim 10 wherein said scale has scale indicia arranged along a direction of reciprocation of said reciprocating portion, said scale of one of said cylinder devices being staggered by half a pitch relative to said indicia of the scale of another cylinder device.

* * * * *